US012173851B2

(12) United States Patent
Cheon et al.

(10) Patent No.: US 12,173,851 B2
(45) Date of Patent: Dec. 24, 2024

(54) INSULATION STRUCTURE OF MEMBRANE TYPE STORAGE TANK

(71) Applicant: DAEWOO SHIPBUILDING & MARINE ENGINEERING CO., LTD., Geoje-si (KR)

(72) Inventors: Byoung Hee Cheon, Busan (KR); Seong Woo Park, Geoje-si (KR); Seung Min Kwon, Incheon (KR)

(73) Assignee: HANWHA OCEAN CO., LTD., Geoje-si (KR)

( * ) Notice: Subject to any disclaimer, the term of this patent is extended or adjusted under 35 U.S.C. 154(b) by 615 days.

(21) Appl. No.: 17/290,920

(22) PCT Filed: Nov. 14, 2019

(86) PCT No.: PCT/KR2019/015583

§ 371 (c)(1),
(2) Date: May 3, 2021

(87) PCT Pub. No.: WO2020/101407

PCT Pub. Date: May 22, 2020

(65) Prior Publication Data

US 2021/0388945 A1 Dec. 16, 2021

(30) Foreign Application Priority Data

Nov. 14, 2018 (KR) ........................ 10-2018-0139632

(51) Int. Cl.

| | |
|---|---|
| ***F17C 3/02*** | (2006.01) |
| ***B63B 25/16*** | (2006.01) |
| ***F17C 13/00*** | (2006.01) |

(52) U.S. Cl.

CPC .............. *F17C 3/027* (2013.01); *B63B 25/16* (2013.01); *F17C 13/001* (2013.01);
(Continued)

(58) Field of Classification Search

CPC .............................. F17C 3/027; F17C 13/001; F17C 2203/0333; F17C 2203/0358;
(Continued)

(56) References Cited

U.S. PATENT DOCUMENTS

2015/0354756 A1 12/2015 Philippe et al.
2017/0175952 A1* 6/2017 Heo ........................ F17C 3/025

FOREIGN PATENT DOCUMENTS

CN 106573663 A 4/2017
CN 106573664 A 4/2017
(Continued)

OTHER PUBLICATIONS

Office Action dated Nov. 17, 2022 in counterpart KR Application No. 10-2018-0139632.
(Continued)

*Primary Examiner* — Elizabeth J Volz
(74) *Attorney, Agent, or Firm* — Knobbe, Martens, Olson & Bear, LLP

(57) ABSTRACT

An insulation structure of a membrane type storage tank is disclosed. The membrane type storage tank includes a secondary insulation wall comprising a plurality of secondary insulation panels; a primary insulation wall which comprises a plurality of primary insulation panels, and which is disposed at the upper part of the secondary insulation wall; and a plurality of fixing devices provided at the upper parts of the secondary insulation panels to be coupled with the primary insulation panels, wherein the plurality of fixing devices are arranged on the center line of the secondary insulation panels in a width direction so that the movement of the fixing devices in the width direction is prevented, and the plurality of fixing devices are arranged to be spaced at equal intervals with respect to the longitudinal direction of the secondary insulation panels.

6 Claims, 3 Drawing Sheets

(52) U.S. Cl.
CPC ................. *F17C 2203/0333* (2013.01); *F17C 2203/0358* (2013.01); *F17C 2203/0629* (2013.01); *F17C 2223/0161* (2013.01); *F17C 2225/0161* (2013.01); *F17C 2260/011* (2013.01); *F17C 2270/0107* (2013.01)

(58) Field of Classification Search
CPC ...... F17C 2203/0629; F17C 2225/0161; F17C 2260/011; F17C 2223/0161; F17C 2270/0107; B63B 25/16
USPC ........... 220/560.07, 592.2, 592.26; 114/74 A
See application file for complete search history.

(56) References Cited

FOREIGN PATENT DOCUMENTS

| | | | | | |
|---|---|---|---|---|---|
| CN | 106660617 | A | | 5/2017 | |
| CN | 107835915 | A | | 3/2018 | |
| EP | 3339160 | A1 | | 6/2018 | |
| FR | 2987100 | A1 | | 8/2013 | |
| FR | 3001945 | A1 | | 8/2014 | |
| JP | 2014-521024 | A | | 8/2014 | |
| KR | 10-1180742 | B1 | | 9/2012 | |
| KR | 10-2013-0033470 | A | | 4/2013 | |
| KR | 10-2013-0099900 | A | | 9/2013 | |
| KR | 20130099900 | | * | 9/2013 | ............ B63B 25/16 |
| KR | 10-2016-0008907 | B | | 1/2016 | |
| KR | 10-2017-0050586 | A | | 5/2017 | |
| WO | 2014167206 | A1 | | 10/2014 | |

OTHER PUBLICATIONS

European Extended Search Report dated Oct. 18, 2022 for counterpart EP Application No. 19884289.0.
International Search Report of PCT Application No. PCT/KR2019/015583—4 pages (Feb. 25, 2020).
Office Action in corresponding CN Application No. 201980075471.X dated Feb. 26, 2023.
Written Opinion in corresponding SG Application No. 11202104684X dated Feb. 24, 2023.
Search report in corresponding SG Application No. 11202104684X dated Feb. 22, 2023.

* cited by examiner

INSULATION STRUCTURE OF MEMBRANE TYPE STORAGE TANK

TECHNICAL FIELD

The present invention relates to an insulation structure of a membrane type storage tank. More particularly, the present invention relates to an insulation structure of a panel type membrane storage tank, which can minimize effects of thermal contraction and motion of a hull on an anchoring point of a securing device disposed on an upper surface of a secondary insulation wall.

BACKGROUND ART

Natural gas is transported in a gaseous state via onshore or offshore gas pipelines, or is transported in a liquid state, that is, in the form of liquefied natural gas (LNG) to a distant destination by an LNG carrier. LNG is obtained by cooling natural gas to a cryogenic temperature (about −163° C.) and has a volume of about 1/600 that of natural gas in a gaseous state. Thus, LNG is suited to long distance transport by sea.

Structures for transporting or storing LNG, such as an LNG carrier designed to carry LNG by sea to an onshore consumer site, are equipped with a storage tank that can withstand cryogenic temperatures of LNG (commonly referred to as “cargo hold”).

Such an LNG storage tank is divided into an independent type storage tank and a membrane type storage tank depending on whether a load of cargo is directly applied to an insulator.

Thereamong, the membrane type storage tank is generally installed by sequentially stacking a secondary insulation wall, a secondary sealing wall, a primary insulation wall, and a primary sealing wall on an inner wall of the hull. Depending on whether the primary insulation wall and the secondary insulation wall are provided in the form of an insulation box or are provided in the form of an insulation panel, the membrane type storage tank is divided into a box type insulation system and a panel type insulation system.

A representative example of the box type insulation system is a GTT NO 96 storage tank and a representative example of the panel type insulation system is MARK III storage tank.

The primary and secondary sealing walls of the NO 96 storage tank are formed of a 0.5 mm to 0.7 mm thick Invar (Ni content: 36%) membrane sheet.

The primary and secondary insulation walls of the NO 96 storage tank are provided in the form of an insulation box fabricated by filling a plywood box with perlite powder, wherein insulation boxes thus fabricated may be connected to one another through a coupler.

For the NO 96 storage tank, each of the primary and secondary sealing walls is formed of a flat Invar membrane without corrugations. In order to use such a flat invar membrane as the primary and secondary sealing walls, the primary and secondary insulation walls need to be provided in the form of an insulation box that has high rigidity and is resistant to deformation due to thermal contraction.

Due to a flat, corrugation-free shape thereof, the sealing walls of the NO 96 storage tank are easy to weld, as compared with sealing walls of the MARK III storage tank, making it relatively easy to adopt an automated welding process.

As described above, in order to use such a flat, corrugation-free metal membrane as primary and secondary sealing walls of NO 96 storage tank, the primary and secondary insulation walls need to be provided in the form of an insulation box that has high rigidity and is resistant to deformation due to thermal contraction. However, the NO 96 storage tank adopting such box type insulation walls has poor thermal performance, as compared with the MARK III storage tank, which is a panel type insulation system, and has a risk of buckling failure depending on the height of the insulation walls.

For the MARK III storage tank, the primary sealing wall is formed of an about 1.2 mm thick stainless steel (SUS) membrane sheet and the secondary sealing wall is formed of a rigid triplex.

The primary and secondary insulation walls of the MARK III storage tank are provided in the form of a sandwich panel fabricated by bonding plywood to an upper surface and/or a lower surface of high-density polyurethane foam (PUF).

The secondary insulation wall is attached and secured to the inner wall of the hull through an adhesive such as mastic, and the primary insulation wall is securely disposed on an upper surface of the secondary sealing wall through coupling to a securing device disposed on an upper surface of the secondary insulation wall.

The primary sealing wall is welded and secured to an anchor strip disposed on an upper surface of the primary insulation wall. In addition, the primary sealing wall is formed with corrugations to absorb contraction due to low temperatures.

The MARK III storage tank has disadvantages in terms of installation/fabrication due to a low rate of automation due to complexity in welding of the primary sealing wall, which is formed of a corrugated membrane. However, since the stainless steel membrane and the triplex are less expansive and easier to construct than the Invar membrane and the polyurethane foam has good insulation performance, the MARK III storage tank is widely used along with the NO 96 storage tank.

DISCLOSURE

Technical Problem

A panel type membrane storage tank as described above adopts a foam insulator having a high coefficient of thermal expansion as primary and secondary insulation walls and thus undergoes a considerable amount of contraction-induced displacement under cryogenic conditions.

Moreover, for the panel type membrane storage tank, the secondary insulation wall is attached and secured to the hull through an adhesive, causing motion of the hull to be directly transferred to the secondary insulation wall. That is, the secondary insulation wall is subjected to not only stress due to thermal contraction at cryogenic temperatures, but also stress due to the motion of the hull.

If deformation occurs in the secondary insulation wall due to thermal contraction at cryogenic temperatures or the motion of the hull, displacement can also occur at an anchoring point (location) of a securing device disposed on an upper surface of the secondary insulation wall for installation of the primary insulation wall.

Such displacement of the securing device affects the primary insulation wall coupled to the securing device and, furthermore, induces concentration of stress in a secondary sealing wall connected to the securing device, causing, at worst, cracking of the secondary sealing wall and insulation failure.

Embodiments of the present invention provide an insulation structure of a panel type membrane storage tank, which can prevent a securing device disposed on an upper surface of a secondary insulation wall from being displaced due to thermal contraction or motion of a hull.

Technical Solution

In accordance with one aspect of the present invention, an insulation structure of a membrane type storage tank includes: a secondary insulation wall formed by arranging multiple secondary insulation panels on an inner wall of a hull; a primary insulation wall formed by arranging multiple primary insulation panels on an upper surface of the secondary insulation wall; a securing device disposed on an upper surface of the secondary insulation panel and coupled to the primary insulation panel; and a slit formed on the upper surface of the secondary insulation panel to extend in a transverse direction of the secondary insulation panel, wherein the securing device is disposed on a transverse center line of the secondary insulation panel, and the slit includes slits formed in front of and at the rear of the securing device, respectively, with reference to a longitudinal direction of the secondary insulation panel, the slits being spaced apart by the same distance from the securing device.

The securing device may include multiple securing devices, and a pair of slits may be formed in front of and at the rear of each of the securing devices, respectively.

The multiple securing devices may be equidistantly arranged with reference to the longitudinal direction of the secondary insulation panel.

The insulation structure may further include: multiple securing portions formed at a vertical edge of the primary insulation panel, including four corners thereof, and coupled to the respective securing devices, wherein the securing portion formed at a corner of the primary insulation panel may be coupled to the securing device disposed at a center of the upper surface of the secondary insulation panel such that the primary insulation panel and the secondary insulation panel are arranged to be offset from each other.

Adjacent primary insulation panels may share the securing device disposed therebetween such that at least two securing portions are coupled to one securing device.

Three securing devices may be disposed on the upper surface of the secondary insulation panel, one of the three securing devices being disposed at the center of the upper surface of the secondary insulation panel; and the primary insulation panel may have a total of eight securing portions such that four securing portions are formed at each lateral end of the primary insulation panel, including the corners thereof, with reference to the longitudinal direction of the primary insulation panel, the four securing portions at one lateral end of the primary insulation panel being equidistantly arranged with reference to the longitudinal direction of the primary insulation panel.

In accordance with another aspect of the present invention, an insulation structure of a membrane type storage tank includes: a secondary insulation wall composed of multiple secondary insulation panels; a primary insulation wall composed of multiple primary insulation panels and disposed on an upper surface of the secondary insulation wall; and multiple securing devices disposed on an upper surface of the secondary insulation panel to be coupled to the primary insulation panel, wherein: the multiple securing devices are disposed on a transverse center line of the secondary insulation panel to prevent transverse displacement of the securing devices; and the multiple securing devices are equidistantly arranged with reference to the longitudinal direction of the secondary insulation panel and a pair of slits is formed in front of and at the rear of each of the securing devices, respectively, to be spaced apart by the same distance from the securing device to prevent longitudinal displacement of the securing devices.

The insulation structure may further include securing portions formed at a vertical edge of the primary insulation panel, including four corners thereof, and coupled to the respective securing devices such that the primary insulation panel and the secondary insulation panel are arranged to be offset from each other.

Advantageous Effects

The insulation structure of the membrane type storage tank according to the present invention can effectively prevent transverse or longitudinal movement of the anchoring point of the securing device disposed on the upper surface of the secondary insulation panel, thereby preventing occurrence of stress in the primary insulation wall and the secondary sealing wall due to displacement of the securing device.

In addition, according to another aspect of the present invention in which the primary insulation panel and the secondary insulation panel are arranged to be offset each other, adjacent primary insulation panels may share a securing device disposed therebetween, whereby the number of points at which the primary insulation panel is supported can be maximized with a small number of securing devices. As a result, a stable support structure can be established while improving productivity of the insulation panels. In addition, relative displacement between adjacent panels can be reduced.

BEST MODE

Figure 1:
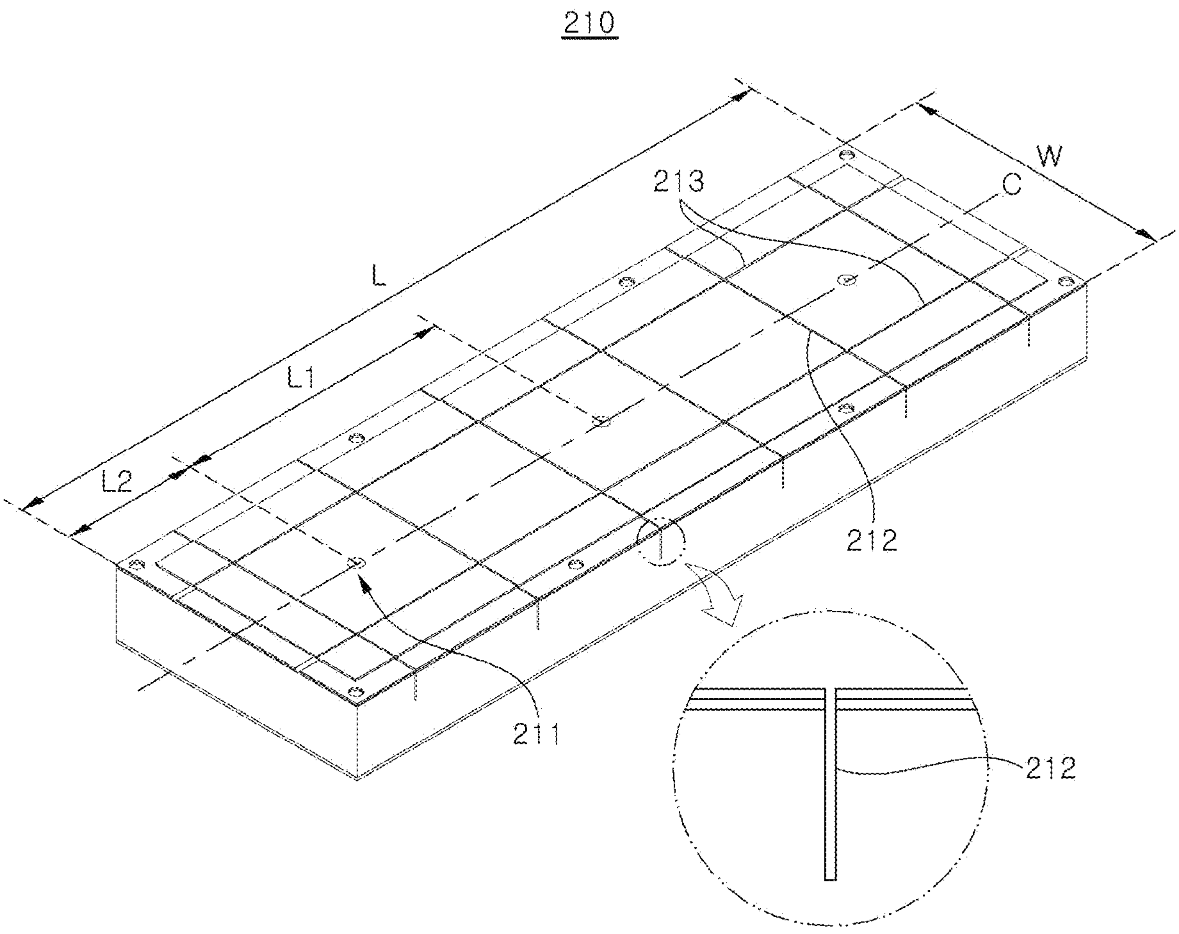
FIG. 1 is a view of a unit of a secondary insulation panel of a membrane type storage tank according to the present invention.

Reference will now be made in detail to various embodiments, examples of which are illustrated in the accompanying drawings, in order to provide thorough understanding of the above and other aspects, features, and advantages of the present invention.

Hereinafter, embodiments of the present invention will be described in detail. Like components will be denoted by like reference numerals throughout the specification.

Herein, the terms "primary" and "secondary" are used to distinguish components providing primary sealing or insulation to an LNG storage tank from components providing secondary sealing or insulation to the LNG storage tank.

Figure 2:
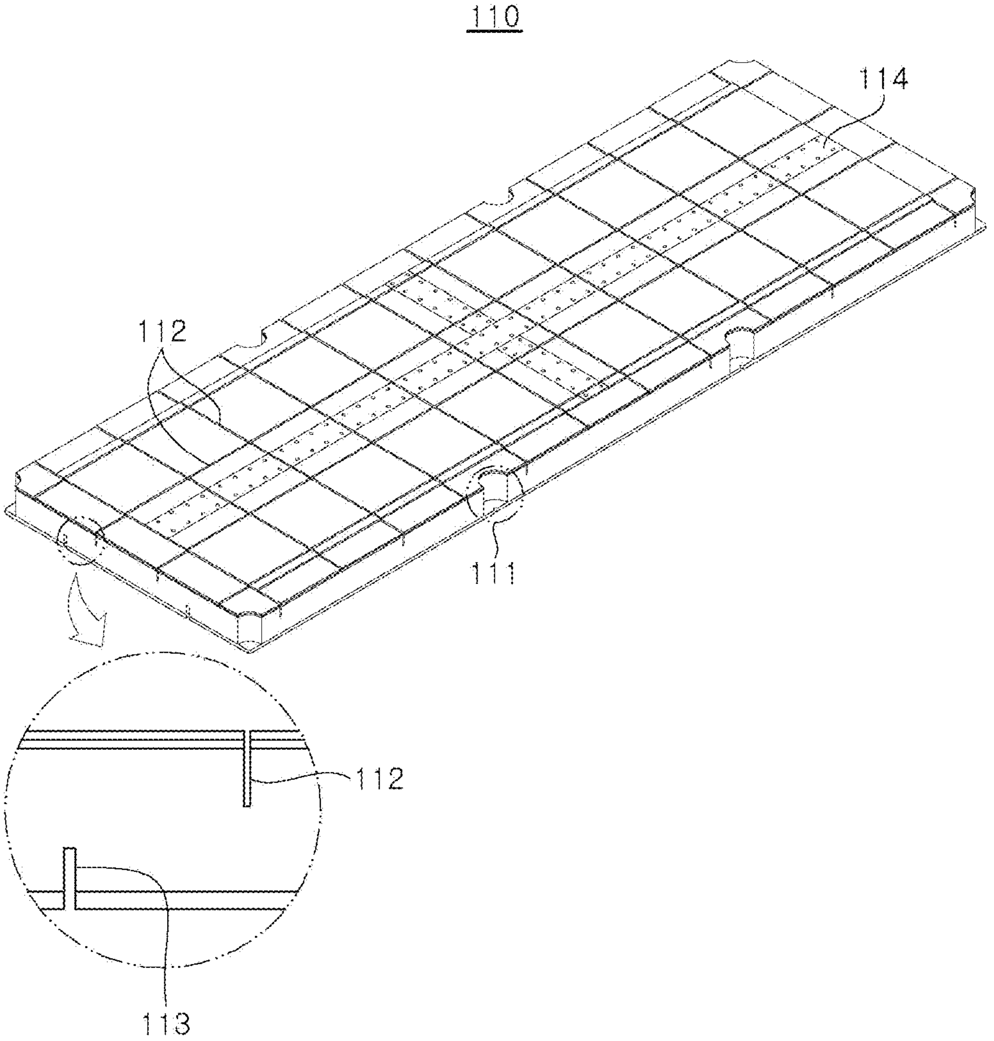
FIG. 2 is a view of a unit of a primary insulation panel of the membrane type storage tank according to the present invention.
Figure 3:
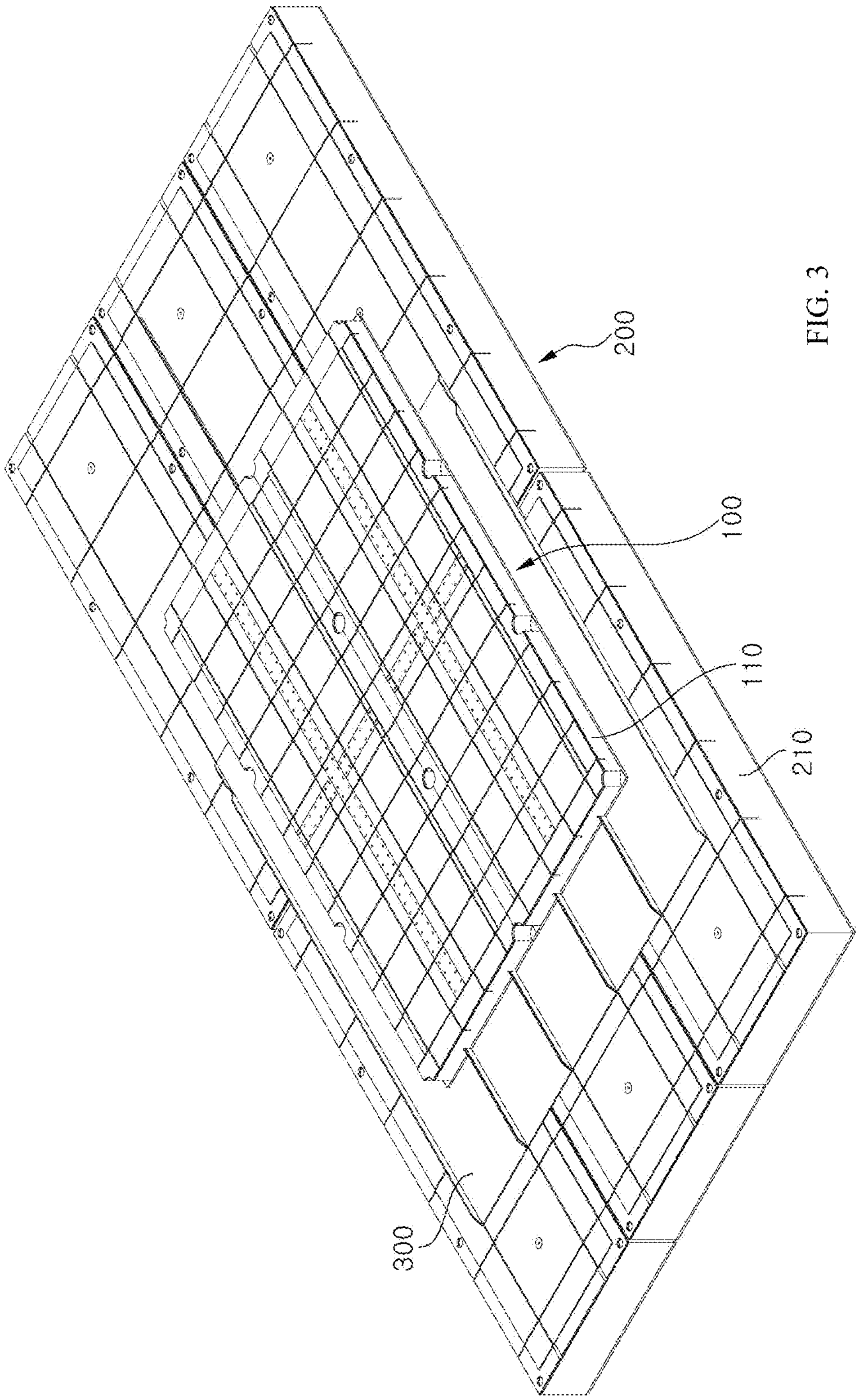
FIG. 3 is a schematic view of an insulation structure of the membrane type storage tank according to the present invention.

FIG. 1 is a view of a unit of a secondary insulation panel of a membrane type storage tank according to the present invention, FIG. 2 is a view of a unit of a primary insulation panel of the membrane type storage tank according to the present invention, and FIG. 3 is a schematic view of an insulation structure of the membrane type storage tank according to the present invention.

Referring first to FIG. 3, a membrane type storage tank according to the present invention includes: a secondary insulation wall 200 composed of multiple secondary insulation panels 210; and a primary insulation wall 100 composed of multiple primary insulation panels 110, wherein the secondary insulation wall and the primary insulation layer are sequentially stacked on an inner wall of a hull.

The membrane type storage tank may further include: a secondary sealing wall 300 interposed between the secondary insulation wall 200 and the primary insulation wall 100; and a primary sealing wall (not shown) disposed on a surface of the primary insulation wall 100 facing away from the secondary insulation wall. For convenience of description, the primary sealing wall is not shown in the drawings.

In the present invention, the secondary insulation panel 210 may be provided in the form of a cuboidal unit panel such that the secondary insulation wall 200 can be formed by arranging multiple secondary insulation panels 210 on the inner wall of the hull in the transverse and longitudinal directions of the inner wall.

Similarly, the primary insulation panel 110 may be provided in the form of a cuboidal unit panel such that the primary insulation wall 100 can be formed by arranging multiple primary insulation panels 110 on the secondary sealing wall 300 in the transverse and longitudinal directions of the secondary sealing wall.

The secondary insulation panel 210 may be secured to the inner wall of the hull through an adhesive, such as mastic, or a stud, and the primary insulation panel 110 may be coupled and secured to a securing device disposed on an upper surface of the secondary insulation panel 210 with the secondary sealing wall 300 interposed between the primary insulation panel 110 and the secondary insulation panel 210.

In the membrane type storage tank according to the present invention, each of the primary insulation wall 100 and the secondary insulation wall 200 is provided in the form a panel type insulation wall composed of an insulation panel fabricated by bonding plywood to an upper surface and/or a lower surface of polyurethane foam, and the secondary sealing wall 300 is formed of a 0.5 mm to 0.7 mm thick Invar membrane sheet.

This structure is aimed at improving productivity by enhancing the level of welding automation upon disposing the secondary sealing wall 300 on the upper surface of the secondary insulation wall 200. However, in order to use a flat Invar membrane as the secondary sealing wall 300, it is necessary to reinforce rigidity of the secondary insulation wall 200.

In the present invention, this problem is solved by disposing a transverse connector (not shown) at each corner of the storage tank.

The transverse connector (commonly referred to as "Invar tube") is a grid-shaped structure disposed along edges of front and rear walls of the storage tank and serves to transmit various loads applied to the primary and secondary sealing walls to the hull.

The transverse connector may be welded to an anchoring bar formed on the inner wall of the hull. Opposite ends of each of the primary and secondary sealing walls are secured to and supported by the transverse connector by welding, whereby various loads applied to the primary and secondary sealing walls can be transmitted to the hull through the transverse connector.

Accordingly, in the present invention, the secondary insulation panel 210 supporting the secondary sealing wall 300 may be provided in the form of an insulation panel that has lower rigidity than an insulation box.

As in a conventional panel type membrane storage tank, the primary sealing wall may be formed of a stainless steel (SUS) membrane and may be formed with multiple corrugations to absorb contraction due to low temperatures.

Next, characteristics of the secondary insulation panel 210 and the primary insulation panel 110 will be described with reference to FIG. 1 and FIG. 2.

Referring to FIG. 1, the secondary insulation panel 210 may be provided in the form of a cuboidal unit panel having a width (W)-to-length (L) ratio of 1:3. Preferably, the secondary insulation panel 210 may be provided in the form of a unit panel having a size of about 1 m×3 m, without being limited thereto.

The secondary insulation panel 210 may be provided on the upper surface thereof with a securing device 211 to which the primary insulation panel 110 is coupled. The securing device 211 may include a stud bolt protruding upward to be coupled to the primary insulation panel 110 and a nut fastened to the stud bolt.

The present invention provides arrangements designed to minimize displacement of the securing device 211, including an arrangement for minimizing transverse displacement of the securing device 211 and an arrangement for minimizing longitudinal displacement of the securing device 211.

In the present invention, in order to prevent the securing device 211 from being displaced in a transverse direction of the secondary insulation panel 210, the securing device 211 is disposed on a transverse center line C of the secondary insulation panel 210.

In this arrangement, even if stress is applied to the secondary insulation panel 210 in the transverse direction of the secondary insulation panel 210, the securing device 211 disposed at the transverse center of the secondary insulation panel 210 receives the same amount of stress from opposite transverse directions, thereby minimizing transverse movement of an anchoring point at which the securing device 211 is disposed on the secondary insulation panel.

In addition, in the present invention, in order to prevent the securing device 211 from being displaced in the longitudinal direction of the secondary insulation panel 210, multiple securing devices 211 are equidistantly arranged with reference to the longitudinal direction of the secondary insulation panel 210 and a pair of slits 212 extending in the transverse direction of the secondary insulation panel 210 is formed in front of and at the rear of each of the securing devices 211, respectively.

According to one embodiment, the secondary insulation panel 210 may be provided on the upper surface thereof with three securing devices 211. Here, one securing device 211 is disposed at the center of the secondary insulation panel 210 and the other two securing devices 211 are disposed to be spaced apart from the one securing device 211 disposed at the center of the secondary insulation panel 210 by the same distance in the longitudinal direction of the secondary insulation panel 210.

Assuming that the distance between a pair of adjacent securing devices 211 is L1 and the distance between an outermost securing device 211 and an edge of the secondary insulation panel 210 is L2, a ratio of L1 to L2 may be 2:1.

As described above, the secondary insulation panel 210 has a pair of slits 212 formed in front of and at the rear of each of the securing devices 211, respectively, with reference to the longitudinal direction of the secondary insulation panel 210. Here, the front slit 212 and the rear slit 212 may be spaced apart by the same distance from the securing device 211.

In this arrangement, even if stress is applied to the secondary insulation panel 210 in the longitudinal direction of the secondary insulation panel 210, stress distribution can be achieved by the multiple slits 212 formed in the secondary insulation panel 210 and the securing device 211 disposed midway between the pair of slits 212 can receive the same amount of stress from opposite longitudinal directions, thereby minimizing longitudinal movement of the anchoring point at which the securing device 211 is disposed on the secondary insulation panel.

As such, the present invention provide arrangements capable of minimizing transverse or longitudinal movement of the anchoring point of the securing device 211 disposed on the upper surface of the secondary insulation panel 210.

Thus, even when the secondary insulation panel 210 undergoes deformation due to thermal contraction or motion of the hull, the membrane type storage tank according to the present invention can prevent displacement of the securing device 212, thereby preventing occurrence of stress in the primary insulation wall 100 and the secondary sealing wall 300.

Reference numeral 213 denotes a groove receiving a tongue to which the secondary sealing wall 300 formed of an Invar membrane sheet is welded. The Invar membrane sheet forming the secondary sealing wall 300 may have an upwardly bent edge adapted to be secured to the tongue by welding.

Referring to FIG. 2, the primary insulation panel 110 may be provided in the form of a unit panel having the same size as the secondary insulation panel 210.

The primary insulation panel 110 may have securing portions 111 formed at four corners and a vertical edge at lateral ends thereof and coupled to respective securing devices 211 disposed on the secondary insulation panel 210.

The securing portion 111 may be provided in the form of a groove having a semicircular or sectoral cross-section. The primary insulation panel 110 may be disposed on the secondary insulation panel 120 by inserting the stud bolt of the securing device 211 into the securing portion 111, followed by fastening the nut to the stud bolt against the securing portion 111.

As shown in FIG. 2, one primary insulation panel 110 may have a total of eight securing portions 111. Here, the securing portions 111 at one lateral end of the primary insulation panel may be equidistantly arranged in the longitudinal direction of the primary insulation panel 110.

The primary insulation panel 110 may have multiple longitudinal and transverse slits 112 formed on the upper surface thereof to relieve stress concentration due to thermal contraction caused by LNG at cryogenic temperatures.

Each of the slits 112 formed on the upper surface of the primary insulation panel 110 may be filled with glass wool to prevent transmission of cold air through an empty space. Here, the glass wool may be compressively inserted into the slit to be flexible in responding to widening of the slit due to thermal contraction of the primary insulation panel caused by LNG at cryogenic temperatures. Like the slits 112, the slits 212 formed in the secondary insulation panel 210 described above may be filled with compressed glass wool.

The primary insulation panel 110 may have a receiving groove 113 formed on a lower surface thereof to receive the tongue disposed on the upper surface of the secondary insulation panel 210 and the upwardly bent edge of the Invar membrane sheet of the secondary sealing wall 300, which is welded to the tongue.

Reference numeral 114 denotes an anchor strip to which the primary sealing wall is welded.

Referring back to FIG. 3, the membrane type storage tank according to the present invention has a structure in which the secondary insulation panel 210 and the primary insulation panel 110 on the upper surface of the secondary insulation panel are arranged in an offset manner relative to each other.

As shown in FIG. 3, the primary insulation panel 110 may be offset relative to the secondary insulation panel 210 such that a corner of the primary insulation panel 110 is located at the center of the secondary insulation panel 210. Accordingly, one primary insulation panel 110 is disposed to span upper surfaces of four underlying secondary insulation panels 210.

The aforementioned configuration in which three securing devices 211 are disposed on the upper surface of the secondary insulation panel 210 and eight securing portions 111 are formed at the corners and lateral ends of the primary insulation panel 110 is provided in consideration of the configuration in which the secondary insulation panel 210 and the primary insulation panel 110 are arranged in an offset manner relative to each other.

In this arrangement, respective securing portions 111 of four primary insulation panels 110, each formed at one corner of a corresponding primary insulation panel, can be coupled to a securing device 211 disposed at the center of the secondary insulation panel 210, and respective securing portions 111 of two primary insulation panels 110, each formed at one lateral end portion of a corresponding primary insulation panel, can be coupled to a securing device 211 disposed away from the center of the secondary insulation panel 210.

As such, adjacent primary insulation panels 110 may share the securing device 211 disposed therebetween. According to this embodiment, the primary insulation panel 110 can be supported at eight points by providing three securing devices 211 to one secondary insulation panel 210.

That is, with the configuration in which multiple securing portions 111 coupled to respective securing devices 211 are formed at the vertical edge of the primary insulation panel 110, the number of points at which the primary insulation panel 110 is supported can be maximized with a small number of securing devices 211, thereby providing a stable support structure while improving productivity of the insulation panels.

Further, with the configuration in which adjacent primary insulation panels 110 are secured to a common securing device 211, relative displacement between adjacent panels can be reduced.

Although the present invention has been described with reference to some embodiments in conjunction with the accompanying drawings, it should be understood that the foregoing embodiments are provided for illustration only and are not to be in any way construed as limiting the present invention, and that various modifications, changes, alterations, and equivalent embodiments can be made by those skilled in the art without departing from the spirit and scope of the invention The accompanying claims and their equivalents are intended to cover such modifications and the like as would fall within the scope and spirit of the invention.

What is claimed is:

1. An insulation structure of a membrane type storage tank, comprising:

a secondary insulation wall formed by arranging multiple secondary insulation panels on an inner wall of a hull;

a primary insulation wall formed by arranging multiple primary insulation panels on an upper surface of the secondary insulation wall;

a secondary sealing wall interposed between the secondary insulation wall and the primary insulation wall, the secondary sealing wall being formed of a flat Invar membrane without corrugation;

a primary sealing wall disposed on a surface of the primary insulation wall;

a transverse connector disposed at each corner of the storage tank, and securing to and supporting ends of each of the primary and secondary sealing walls, that transmits loads on the primary and secondary sealing walls to the hull;

a securing device disposed on an upper surface of the secondary insulation panel and coupled to the primary insulation panel thereto; and a slit formed on the upper surface of the secondary insulation panel and extending in a transverse direction of the secondary insulation panel, wherein the primary and the secondary insulation panels are provided as a cuboidal-shaped panel in which plywood is bonded to at least one of an upper and a lower surface of polyurethane foam, wherein the securing device is disposed on a transverse center line of the secondary insulation panel, and wherein the slit comprises slits formed in front of and at the rear of the securing device, respectively, with reference to a longitudinal direction of the secondary insulation panel, the slits being spaced apart by the same distance from the securing device.

2. The insulation structure according to claim 1, wherein the securing device comprises multiple securing devices and a pair of slits is formed in front of and at the rear of each of the multiple securing devices, respectively.

3. The insulation structure according to claim 2, wherein the multiple securing devices are equidistantly arranged with reference to the longitudinal direction of the secondary insulation panel.

4. The insulation structure according to claim 3, further comprising:

multiple securing portions formed at sides and corners of the primary insulation panel, including four corners thereof, and coupled to the respective securing devices, wherein one of the securing portions formed at a corner of the primary insulation panel is coupled to the securing device disposed at a center of the upper surface of the secondary insulation panel such that the primary insulation panel and the secondary insulation panel are arranged to be offset from each other.

5. The insulation structure according to claim 4, wherein adjacent primary insulation panels share the securing device disposed therebetween such that at least two securing portions are coupled to one securing device.

6. The insulation structure according to claim 4, wherein:

three securing devices are disposed on the upper surface of the secondary insulation panel, one of the three securing devices being disposed at the center of the upper surface of the secondary insulation panel; and the primary insulation panel has a total of eight securing portions such that four securing portions are formed at each lateral end of the primary insulation panel, including the corners thereof, with reference to the longitudinal direction of the primary insulation panel, the four securing portions at one lateral end of the primary insulation panel being equidistantly arranged with reference to the longitudinal direction of the primary insulation panel.

* * * * *